Sept. 3, 1963　　　E. F. PETERSON　　　3,102,309
CORE BOX SEALING STRIP AND METHOD OF ATTACHMENT
Filed March 28, 1960　　　2 Sheets-Sheet 1
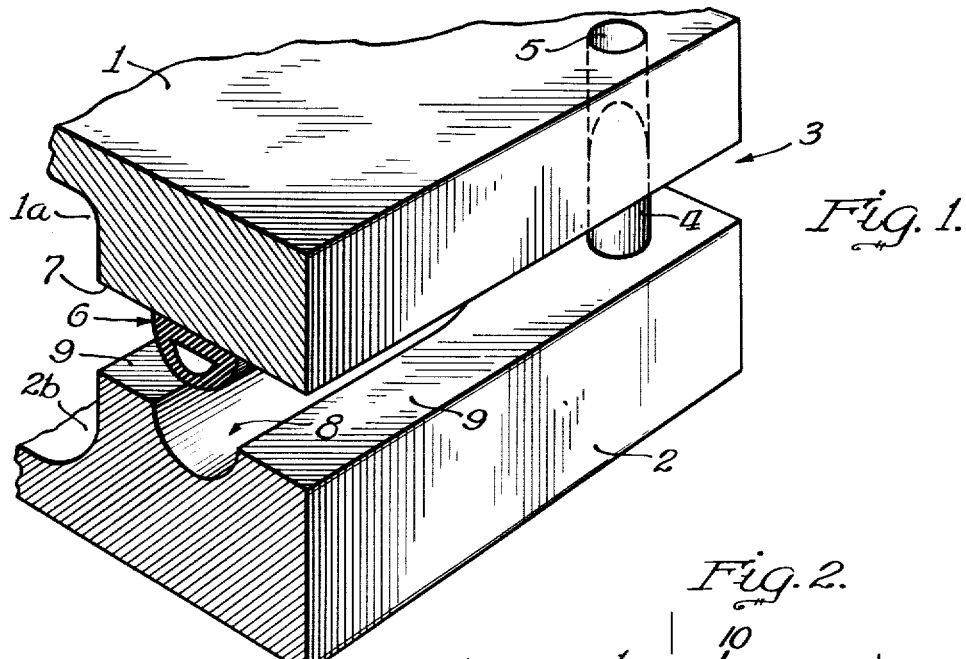
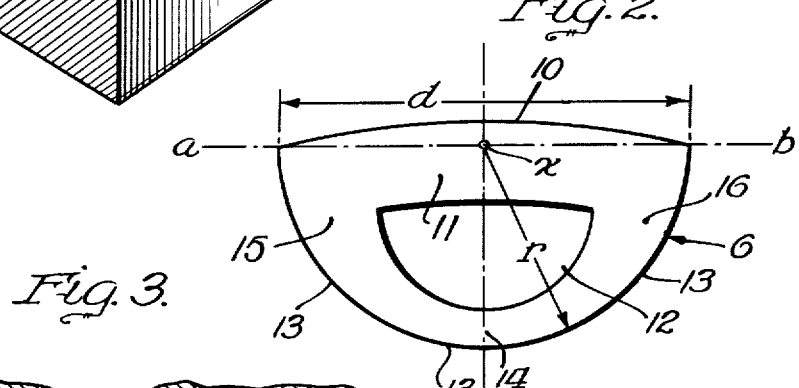
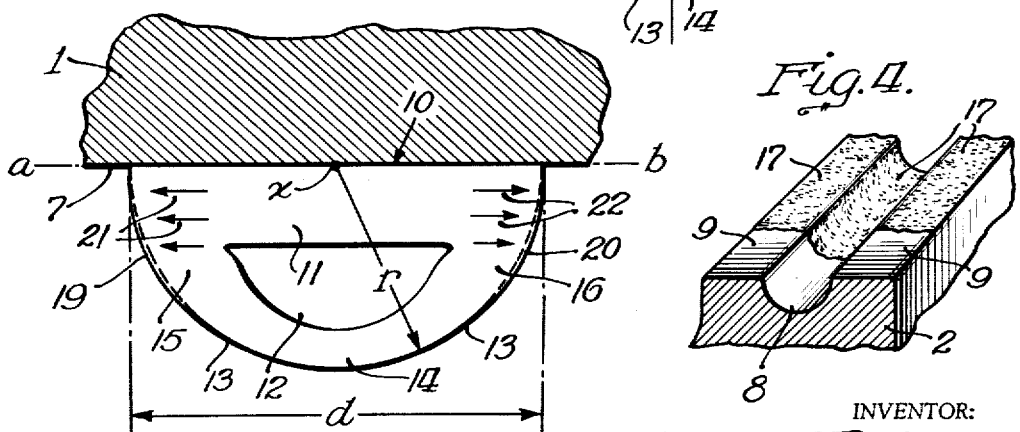
INVENTOR:
Edwin F. Peterson
BY
Eberhard E. [illegible]
Atty.

Sept. 3, 1963     E. F. PETERSON     3,102,309
CORE BOX SEALING STRIP AND METHOD OF ATTACHMENT
Filed March 28, 1960     2 Sheets-Sheet 2
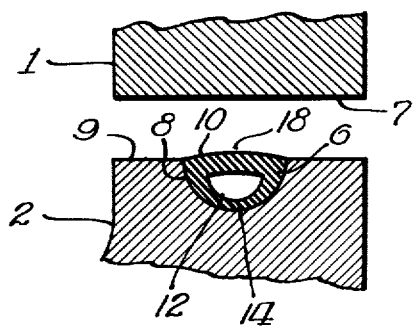
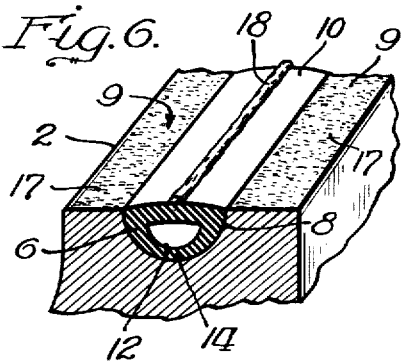
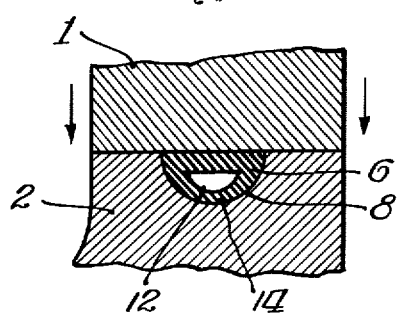
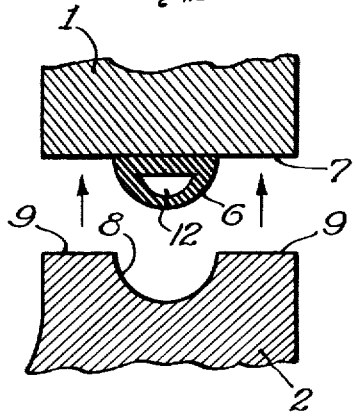
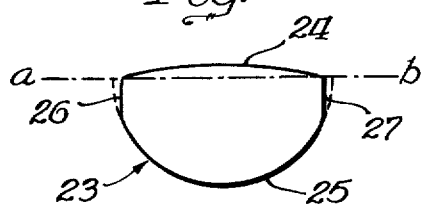
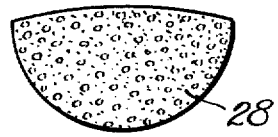
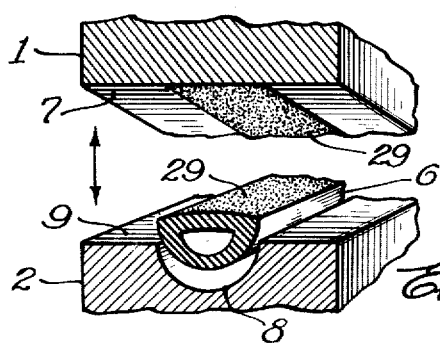
INVENTOR:
Edwin F. Peterson
BY
Eberhard E. Wolley
Atty.

United States Patent Office 3,102,309
Patented Sept. 3, 1963

3,102,309
CORE BOX SEALING STRIP AND METHOD
OF ATTACHMENT
Edwin F. Peterson, P.O. Box 151, Neponset, Ill.
Filed Mar. 28, 1960, Ser. No. 17,999
7 Claims. (Cl. 22—13)

This invention relates to a sealing means that is effective as a barrier to counteract fluid passage between two surface mating abutting elements subjected to a pressure differential between the opposite ambient fluid zones separated by such elements.

More specifically, the invention is directed to a core box sealing strip and to the method of attachment or installation of such a fluid barrier. The purpose of this seal is to provide a simple inexpensive and effective sealing means for operative installation along selected marginal surface areas of a multiple piece unit of matching coacting core box sections subjected to internal pressure conditions, the seal strip means counteracting blowby and fluid leak.

One of the objects of the invention is to provide a single individual resilient seal strip with a single seal cavity to accommodate the seal strip, with the strip and cavity being on mating separable parts respectively of a core box assembly, and which seal means require only one mechanical or structural change in only one core box part for the attachment and subsequent operative use of the seal means of this invention.

Another object is to provide a method for assembling the sealing means for operation between opposed mating surface parts which includes the provision of a seal slot or groove in one part as one portion of the seal means whereby such a groove initially functions as the sole orientation instrumentality for a coacting seal unit in effecting the accurate attachment of that other unit to the other of the mating surface parts, and whereby the same coacting seal means, the groove and seal unit, subsequently comprise the major fluid seal elements of the inventive concept herein disclosed and described.

Another object of this invention is to form a fluid seal means having one seal member in the form of a resilient strip which has an extended base to provide a given surface area thereon that is abuttingly attachable to a surface face on one of the coacting mating parts of a core box or the like, to thereby dispose such a strip seal member solely upon and against the surface face as a raised unit totally extending away from the plane of the surface area of the associated mating part.

A further advantage in a resilient strip seal of this nature lying to one side and above the surface to which it is attached is to provide such seal with a hollow interior running along the seal lengthwise thereof which establishes a strip that has the ability to readily collapse and react under contact by a core box part or by some other object, thereby further augmenting the natural resiliency of the seal member to counteract damage and deterioration of such a seal member under continued use.

The strip seal is constructed with thicker lateral wall portions and with a comparatively thinner head portion to place the body material in locations to best counteract impact from objects. Any lateral impact is readily warded off or deflected by the outwardly rounded heavier lateral wall portions of the seal, while any lateral impact across the head of the seal is readily warded off or deflected by seal collapse. Any downward impact is not as likely to damage the strip seal nor will it tend to be transmitted to the fastened part or base of the seal strip, the strip obviously readily compressing and spreading under impacts that may be encountered that are directed downwardly toward the seal supporting surface area.

Another object of this invention is to provide a sealing strip having a half round portion disposed to one side of a diametral line, with a matching groove also being formed as a half round depressed recess considered in cross section and with the surface adjacent the groove carrying part being coincident with the diametral terminal surface plane of the groove, and wherein said seal strip includes an excess portion lying above the diametral top or base part of such a strip seal. This physical relationship of the seal is established in the extrusion of the strip and provides a means to induce a predetermined deformation into the seal strip when the latter is firmly attached under control to the surface of the seal strip carrying part. The subsequent resulting deformation by securement contributes to the sealing value and efficiency of the seal and to the reactance of the seal to impact damage by core box parts or other objects.

A still further object is to provide a seal strip wherein the attaching face of the seal strip has a crowned base surface forming a part of a convex bridge wall, which wall is subsequently deformed into a straight wall to induce a controlled deformation into the seal that acts to bulge the lateral flanking sides of the seal member under internally created latent force vectors. This relationship also reinforces the normal reactive quality of the resilient strip seal to better counteract lateral impact blows directed against the seal means under conditions of use in core blowing practice and increases the sealing ability of the seal means.

One other object is to effect the attachment of the strip to a surface of a core box assembly part through the use of a pressure reactive sensitive adhesive having characteristics and properties that are inherent in an Eastman Kodak Company product identified as Eastman 910 Adhesive, which adhesive is a cyanoacrylate monomer modified with a thickening agent and plasticizer.

And a further object of the invention is to provide a method of installation of the coacting seal means which is direct and efficient, quick and simple, and wherein only one tool is required to perform a simple grooving operation in preparing one of the core box parts for seal acceptance.

Other objects and advantages shall hereinafter appear in or become apparent from the following detailed description of the invention having reference to the accompanying drawings forming a part of this specification.

In the drawings:

FIG. 1 is a fragmentary perspective view of a conventional core box showing two separable sections being oriented by conventional dowel pin means, said core box sections incorporating the sealing means of the present invention, with the core box sections being illustrated in slightly separated relation;

FIG. 2 is an enlarged end elevational view of the strip seal of this invention as the same appears in its unattached stock form;

FIG. 3 is a diagrammatic end view of the seal strip as the same appears when firmly secured to the underside or matching face of the top section of the core box, the top section being shown in section with the seal strip per se being shown in elevation;

FIG. 4 is a fragmentary perspective view of a part of the lower core box section containing the cooperating seal groove for the seal strip, this view illustrating the application of a separating medium such as a wax fluid to provide one of the steps in the method of orienting and securing a strip into its required location upon and against one of the core box sections.

FIG. 5 illustrates fragmentary portions of the mating core box sections as separated and with the strip seal oriented within the prefabricated groove of the lower section, plus the application of the cementitious adhesive prior to the bonding of the strip seal to the upper core box section;

FIG. 6 is a perspective of a fractional part of the seal strip carrying portion of the lower core box section to better illustrate the addition of the cementitious adhesive upon the surface of the seal strip;

FIG. 7 shows the contact step of the two core box sections to effect the attachment and cementing of the strip seal to the overlying opposing face of the upper core box section which is to carry the strip;

FIG. 8 illustrates the core box section separation and the final operative association of the sealing parts comprising the strip seal on one box part and the coacting sealing groove in the other box part;

FIG. 9 shows an end elevational view of a strip seal having a modified construction adaptable to the same method of attachment and to the same operative use;

FIG. 10 is another end elevational view of a modified strip seal; and

FIG. 11 diagrammatically illustrates fragmentary portions of matching core box parts and a strip seal oriented assembly and the associated seal means providing a modified way of attaching or securing a strip seal to a core box part.

With initial reference to FIG. 1, the invention is here generally shown as comprising a part of at least two separable core box sections or parts 1 and 2 of a core box 3 that is further equipped with orientation guide means such as sets of dowel pins and openings, one pin 4 being shown as an integral portion of section 2 with the matching or coacting opening 5 being provided in section 1. The core box 3 is designed to surround a cavity area or a cavity of predetermined shape designed for blowing sand cores by the pressurized introduction of sand and air into such core box cavity, the cavity being shown by way of illustration in FIG. 1 as having a divided portion of the cavity at 1a in section 1 and a cooperating divided portion at 2b in section 2.

It is known in the art that core box life is short and that costly repairs are needed to service a core box all due to wear, unless some effective seal means can be provided between the matching peripheral face areas of a core box, such face areas surrounding the usual cavitated portions of such a core box. The purpose of this invention is to provide an effective seal means for core boxes and to do so at a minimum cost and with a simple installation procedure.

The new seal is also well shown in FIG. 1 and comprises a seal strip 6 of half moon shape in transverse section which strip is secured to the flat underface 7 of the core box section 1 and a seal strip groove 8 that is formed into the top face 9 of the core box section 2 for snugly accommodating the elongated seal strip 6 when the matching sections of core box 3 are brought together and closed with opposed faces 7 and 9 adjacently positioned in a single common meeting plane.

The strip seal 6 is shown in greater detail in FIG. 2 and comprises, in its unattached form, a base 10 having a slightly outwardly crowned surface which forms a diammetral part of the outwardly convex bridge 11 that is located above an opening 12 running lengthwise of the seal strip 6. The seal strip body depending away from the base provide a true half circle outer face forming an exterior half rounded surface 13 generated by a sweeping radius $r$ from about a point $x$ lying on the strip diameter $a$—$b$. The head portion 14 of the strip 6 is a thinner walled part, while the two lateral flanking walls 15 and 16 of the seal strip 6 are much heavier and substantially as thick as the crowned bridge 11 at their connected ends. The seal strip diameter $d$ is twice the radius $r$, and as shown, the crown surface of base 10 lies above the seal strip diameter $a$—$b$ and in oppositely outwardly disposed relation with respect to the head portion 14 of the seal strip.

The strip 6 is constructed from a flexible or resilient material. Experience has shown that rubber or similar natural resilient material do not fulfill the needs and requirements for sealing a core box due to the quick deterioration of such rubber by solvents, oils, cleaners, and by other fluids of the nature mentioned. It is, therefore, important to use a synthetic resilient material of tough composition for the strip that will adequately resist such fluids as noted. Natural rubber material is also less tough in nature and unable to withstand the hard usage and working conditions in a foundry.

Experience and practice have proven that one of the most satisfactory materials for the seal strip is a synthetic product known and identified as Buna N. This composition material is found in a class of synthetics that are tough and elastic, as well as highly abrasion resistant. Elastomer extrusions of this and like character may include some types of silicones, while another example of a suitable resilient material for the strip is a French product in the form of a castor oil derived nylon sold under the trade name of Rilsan. Urethane elastomers and analogous vinyl compositions are equally well adapted to provide the abrasion resistant strip extrusions.

The method of applying the seal means of the present invention to coacting separable core box units is best understood by referring to FIGS. 4 to 8 in the drawings. A groove 8 is initially suitably supplied about the marginal face portions 9 of section 2 surrounding the cavity portions therein. This is accomplished and preferably done with the use of a ball end milling tool making a slot or groove 8 as a half round linear cavity as considered in transverse section, with the mill diameter being the same as the diameter $d$ of the seal strip 6. This is the only mechanical or physical change needed in preparing the core box for the seal assembly and for the orientation and attachment of the resilient strip seal unit 6.

The next step is to clean the surface areas 7 and 9 of the sections 1 and 2 with a suitable degreasing solvent or with any suitable cleaner such as a toluene-acetone mixture, naptha, trichloroethylene, methylene chloride, tetrachloroethane or the like. Various trade name cleaners may also be used equally well to clean the matching opposing surfaces of the mating core box parts along the areas that are to receive the seal means which include the groove 8 and its adjacent flanking surfaces in one of the core box parts.

After cleaning, a wax material 17 is spread over the surface 9 including the surface areas of the groove 8 as shown in FIG. 4. This material may be a fluid such as a conventional furniture or floor wax to which is added a suitable color material or dye, for example, a coloring matter of the nature commonly employed to dye fabrics. By adding the color to the fluid, it provides a visible means to indicate good coverage of the surface areas of section 2 requiring such application. FIG. 4 shows the wax 17 applied over most of the surfaces except for the near portion for the sake of illustration, it being important to establish a complete cover as will hereinafter be explained.

As previously expressed, the core box parts or sections such as 1 and 2 are separable and depend on proper orientation on the pins 4 and openings 5, the latter means forming conventional mechanisms normally being supplied on core boxes as is well known to those skilled in the core making art.

In FIG. 5, the seal strip 6 has been laid or lengthwise inserted into and along the groove 8 in section 2 to occupy the position indicated. This is a simple operation and if the seal strip should be somewhat out of perfect diametral horizontal alignment with the coextensive surface areas 9 of section 2, the closing of the core box parts will quickly and instantly adjust the strip due to its curved half round head and the corresponding curvature of the slot or groove 8. Under most normal strip insertions, it is a simple matter to place the strip into the position shown in FIG. 5.

After the strip insertion, a small quantity of adhesive 18 is applied along the length of the strip and preferably centrally therealong as shown in FIGS. 5 and 6. The core box sections 1 and 2 are closed thereafter as in FIG. 7 to occupy fully seated face to face positions. This action spreads the adhesive in a film over the surface area of the crowned portion 10 of strip 6 while the convex bridge 11 is also flattened by the upper section 1 as shown to induce or set up internal forces providing reactionary contact to urge the bridge 11 against the underface 7 of section 1. This same action also induces certain beneficial changes in the seal strip as will hereinafter be explained. The adhesive sets or cures under the relationship assumed by the parts as best illustrated in FIG. 7. The adhesive is actively and securably confined directly to the upper base area 10 of the strip 6 and excessive adhesive will merely spread out between the wax protected bottom face 9 and the upper surface area 7 of sections 2 and 1. Obviously, without the wax as a separator or shield, the two core box sections would be cemented together by the Eastman 910 Adhesive and it would be impossible to separate such core box sections. Thus the effective adherence is confined to the strip per se which will easily separate out of groove 8 when section 1 is raised. It is to be understood that the wax in groove 8 under the seal strip 6 location will insure clean separation of the strip after the adhesive has been activated under pressure in the process of assembly of the sealing means.

Separation of parts or sections 1 and 2 of core box 3 will therefore draw the seal strip 6 out of the orientation slot or groove 8 due to the strip being fixedly attached by cemented adherence to section 1. This final assembly thus provides a usable sealing facility and establishes a means conditioned to prevent blowby and sand escape between the matching part faces which are guarded by such seal means upon subsequent and continued use of the core box during the usual core blowing operations.

As this process is carried out to produce a final assembly of the kind seen in FIG. 8, spread of adhesive 18 may be fairly well controlled by the amount of adhesive that is added to the crown of the seal strip. Preferably an excess of adhesive is employed to completely cover the crown 10 of strip 6 during and after the step in FIG. 7 to extend the bonding of strip 6 over its entire base area or attaching face which lies in contact with the undersurface 7 of section 1 of the core box. Excess adhesive will feather or film out between surfaces 7 and 9, but due to the presence of the wax coating 17 over surface 9 as explained above, no bond results between surfaces 7 and 9, the wax material acting as a safeguard and separator confining the total adhesive action to the crown portion of the strip 6 and to the overlying band portion of face 7 of section 1 which is in contact with the strip after closing sections 1 and 2.

It must be understood that the relationship here described involves a cementing of a rubber substance to a metal material. The problem further led to the discovery of an adhesive that will not be subjected to breakdown or separation under normal foundry practice conditions and which would also have the facility to withstand all the rough handling and abuse to which core boxes are subjected under actual working conditions.

The adhesive that has successfully been found and adapted to this purpose to give optimum results and to provide all the attributes deemed necessary and important in developing the seal of this invention is an adhesive product developed by the Eastman Kodak Company, identified as Eastman 910 Adhesive, which is a cyanoacrylate monomer that is modified with a thickening agent and plasticizer.

This adhesive sets quickly when applied and activated by pressure between hard non-porous surfaces like the strip seal and the face of the metal top core box section. The adhesive substance is best suited to application over one surface area only and in very small amounts on the order of one drop or less per square inch of bonding area. Application is readily made by means of dispensing from a polyethylene container having a dispensing spout for that purpose. A medical dropper can also serve as an applicator.

The 910 Adhesive is activated through pressure as by means of urging or pressing the bonding surface areas together to feather spread and thin out the adhesive into a fine quantity film spread. The material polymerizes under the conditions explained causing quick setting and curing in a matter of seconds. By reason of the sensitivity of the adhesive, the process herein provided is developed around the advantageous use of the adhesive making the application, the handling and the final action all direct simple steps necessitating a minimum of effort in assembling the sealing means. A certain amount of spreading of the adhesive is permissible with a wooden spatula or similar tool, although once it is spread into a thinner film, the parts to be cemented must be quickly abutted. It is obvious that spreading of extended areas will have its limitations and that the dispensing of well placed droplets or the applicaion of a continuous bead of adhesive such as shown in FIGS. 5 and 6 will be best adapted to the sealing means herein disclosed.

While the Eastman Kodak 910 Adhesive is mentioned as a single example for purposes of the development of the seal means herein defined, it is to be understood that other adhesive materials having similar characteristics and qualities will also be applicable to secure the seal strip in place upon a core box section by the method and means herein described.

Referring now more specifically to FIG. 3, it should be observed that the strip 6 has undergone a dimensional body change in carrying out the steps to produce the seal as in FIGS. 4 to 8. The strip body change is such as to cause a planned controlled deformation thereof by the introduction of internal force factors. The bridge 11 of the seal strip 6 is shown as straightened by the confined orientation and cementing of the strip under controlled conditions that cause the top or crowned base 10 of the strip to adhere to straighten out and to the flat underface 7 of section 1, while the seal strip diameter is maintained by the limitations of the orientation slot 8 formed in section 2 of the vore box 3.

Thus strip dimension $d$ in FIG. 3 is held to the same diameter $d$ shown in FIG. 2. Excess inward displacement of the bridge 11 into a straight diametral bar or wall is absorbed or permitted by the opening 12 in the seal strip substantially as illustrated in FIG. 3. Withdrawal of strip 6 from groove 8 will cause lateral sealing bulges 19 and 20 to flank the outer sides of the strip throughout the length thereof. Such bulges 19 and 20 will act to increase the sealing efficiency of the strip unit in groove 8 of the core box assembly under operative conditions and will cause the strip unit to conform to minor irregularities that may exist in the walls of groove 8.

It should further be noted that lateral contact by any core box parts or by other objects against the seal strip sides will not cause strip damage because of the hollow or tubular nature of the strip. The seal strip will tend to give and temporarily collapse at the point of impact warding off the part or object while counteracting strip damage. In this connection it is believed that the internally induced forces acting generally as indicated by the sets of arrows 21 and 22 in FIG. 3, will at all times tend to hold the strip in its physical sealing shape or contour thereby providing an added stabilizing concept augmenting or paralleling the normal inherent tendency for the strip to retain its shape under its own originally formed or extruded nature.

An example of this condition might be likened with a situation where a strip is repeatedly contacted by an object at a given point. The tendency would be to eventually cause a somewhat deformed or set surface area that may not seal well with a corresponding wall portion of the strip groove. If the strip were shaped to fit groove 8 without the use of a convex crown and associated bridge, a defective or inefficient condition might occur much sooner than in a seal strip 6 that has the novel extruded shape shown in FIG. 2 and which then assumes the attached physical stressed shape shown in FIG. 3. The FIG. 3 seal strip is over stressed in a controlled direction or directions to hold its sealing shape and thereby does retain its sealing efficiency by its added reluctance to become deformed or set under certain conditions of use.

The foregoing description has been confined to the strip shown in FIGS. 1 to 8. FIGS. 9 and 10 are directed to certain modified forms of the invention. In FIG. 9, a solid strip 23 is shown providing an attaching crown 24 and a half circular sealing bead or head 25, the lateral corners of the strip being omitted to provide vertical lateral flat faces 26 and 27. The external shape or contour of solid strip 23 is substantially the same as that shown in FIG. 2, except for the omission of the full corners on the diametral portion of the extruded unit.

In assembly, this strip 23 is used in the same way and by the method described in the steps shown in FIGS. 4 to 8. During the adhesion phase, the crown 24 will depress into a straight surface causing lateral expansion of the upper or attaching zone of the strip to thereby establish a seal strip having an internally stressed base part contributing to the sealing qualities and having similar attributes as the described strip 6. While strip 6 was hollow, strip 23 is of solid composition with the flat sided portions providing clearance means to accommodate the strip material under deformation. Crown 24 will react against its attaching surface by means of the resulting deformation as depressed for coincidence during the adhesive union against the surface of one of the respective parts of the core box assembly.

In FIG. 10, the strip 28 is neither solid or hollow, but the strip body material is made to embody numerous surrounded and included pores or cavities. This strip is adapted for attachment and provides sealing facilities that can be well understood from the functions and actions of the described sealing strips 6 and 23. A porous unit on the order of strip 28 will require more adhesive and the bonding or curing time is considerably extended as compared with the few seconds needed for maximum adhesion in the previously described forms. This is due to the lack of a solid pressure backing relationship.

One other modified construction of seal means is shown in FIG. 11 wherein all pieces are the same as those shown in FIG. 8, but the method and means of assembly vary from the initially described arrangement. FIG. 11 shows the use of a contact adhesive such as 29 which is spread over the crown surface area of strip 6 and along the corresponding meeting area of section 1 that overlies and receives the strip 6 upon assembly of the core box to the condition noted in FIG. 7. While it may be desirable to clean the surfaces of the means that receive the cement or adhesive, the waxing step of FIG. 4 can be eliminated in the FIG. 11 modification.

With this contact form of adhesive, each of the contacting areas are covered with the adhesive material permitting the material to dry. After the adhesive is dry, the sections 1 and 2 are brought together with the slot or groove 8 providing the orientation means to hold the strip in alignment, as in the other forms, until box section securement and strip attachment. Thereafter, the groove 8 coacts with the strip 6 to form cooperative seal means adapted to repeated use in blowing sand cores in core boxes.

The suggested forms described may be varied or modified without departure from the fundamental concept of the present invention. It is, therefore, understood that certain changes are contemplated in the individual elements of the invention or in the combinations thereof without departure from the original concept. The extent of such modifications shall, however, be governed by the breadth and scope of the language contained in the following claimed subject matter.

What I claim is:

1. A core box sealing means comprising, in combination, a pair of separable core box sections having mating wall surfaces surrounding the core box cavity, one of said core box wall surfaces having a semicircular groove therein, and a seal strip for engagement within said groove, said strip having a longitudinal hollow internal opening with the exterior of said strip normally being provided with a semicircular surface and a convex crowned diametral portion, said crowned portion being secured to said flat surface of said one core box surface with an adhesive whereby to place said strip into an adhesively stressed condition to induce an out-of-round shape to said semicircular surface for sealing purposes, said strip being completely received within said groove when said core box sections are closed to provide a sealing instrumentality located entirely to one side of the common meeting plane of the mating wall surfaces of said core box sections.

2. A core box sealing means comprising, in combination, separable core box sections having coacting wall portions to close off the core box cavity, said wall portions having mating faces abutting each other along a common parting plane, seal means interposed between said mating faces to counteract sand and air leakage from within the box, said seal means comprising a semicircular groove in one mating face and a resilient matching seal strip for said groove connected with the other of said mating faces, said seal strip having a longitudinal internal opening therethrough and normally having an exterior semicircular surface wall portion to fit the groove with a convex base wall portion thereon for securement to said other surface by an adhesive, said strip base when attached through said adhesive providing means to induce a controlled deformation in the outer exposed surface contour of the strip for more efficient sealing contact by said strip with the interior semicircular wall surface of the groove.

3. In the combination of claim 2, wherein said seal strip internal opening is offset with respect to the cross sectional area of the strip in a predetermined position to establish a heavier base wall portion and a thinner semicircular sealing wall portion for the groove engaging part of the strip.

4. A core box sealing means comprising, in combination, core box sections having walls terminating in matching faces meeting in surface to surface contact along the core box parting line, and a seal strip for one matching face having a longitudinal hollow internal opening and comprising a resilient body normally providing a semicircular half round head considered in cross section, said head terminating along a diametral plane, and said strip being normally provided with a securing base on the head in the form of a convex crown disposed to the other side of the diametral plane with respect to the head, the convex crown base of said strip being attached to one of said faces of a core box wall with adhesive to cause said base to assume the configuration of said face and to deform the semicircular half round head through said adhesively stressed relation of said base, said other matching face having a semicircular grooved portion therein substantially complementary to the normal strip shape for the coactive sealing reception of said resilient strip in its adhesively stressed deformed condition.

5. In a pair of separable mating walls presenting coacting flat surface faces arranged in abutting contact with each other to provide a barrier between two ambient fluid zones, the improvement comprising a seal means for said abutting faces to counteract passage of fluid between said surface faces from one fluid zone to the other, said seal means comprising a single semicircular resilient bead having a convex crowned diametral portion abuttingly attached with an adhesive to one of the flat surface faces to cause said bead to assume bulging portions thereon and to project outwardly from said face, said bead having a longitudinally hollow internal opening to enhance the sealing resiliency of said bead, the other of said surface faces having a semicircular groove formed therein to wholly accept said bead with the latter completely filling said groove, said bead providing greater sealing contact within the internal semicircular surface area of said groove under the adhesively stressed bulging portions developed thereon.

6. In the combination defined in claim 5, wherein said convex crowned diametral portion of the bead is attached to the said one surface face with a pressure responsive cement.

7. In the combination defined in claim 6, wherein the internal opening of said bead establishes spaced semicircular sealing portions connected with said convex crowned diametral portion thereof, and the adhesively stressed condition of said diametral portion imparts bulges to said spaced sealing portions of said bead.

References Cited in the file of this patent

UNITED STATES PATENTS

| | | |
|---|---|---|
| 1,882,755 | Boynton | Oct. 18, 1932 |
| 2,306,516 | Zahn | Dec. 29, 1942 |
| 2,510,417 | Rehklau | June 6, 1950 |
| 2,661,229 | Slaughter | Dec. 1, 1953 |
| 2,677,160 | Peterson | May 4, 1954 |
| 2,815,549 | Olson | Dec. 10, 1957 |
| 2,963,766 | Wallace | Dec. 13, 1960 |

UNITED STATES PATENT OFFICE
CERTIFICATE OF CORRECTION

Patent No. 3,102,309 September 3, 1963

Edwin F. Peterson

It is hereby certified that error appears in the above numbered patent requiring correction and that the said Letters Patent should read as corrected below.

Column 10, line 1, for the claim reference numeral "6" read -- 5 --.

Signed and sealed this 25th day of February 1964.

(SEAL)
Attest:
ERNEST W. SWIDER

Attesting Officer

EDWIN L. REYNOLDS
Acting Commissioner of Patents